United States Patent
Farr

(10) Patent No.: US 10,824,614 B2
(45) Date of Patent: Nov. 3, 2020

(54) CUSTOM QUERY PARAMETERS IN A DATABASE SYSTEM

(71) Applicant: SAP SE, Walldorf (DE)

(72) Inventor: Ashley Farr, Brisbane (AU)

(73) Assignee: SAP SE, Walldorf (DE)

( * ) Notice: Subject to any disclaimer, the term of this patent is extended or adjusted under 35 U.S.C. 154(b) by 283 days.

(21) Appl. No.: 15/384,105

(22) Filed: Dec. 19, 2016

(65) Prior Publication Data

US 2018/0046676 A1    Feb. 15, 2018

Related U.S. Application Data

(60) Provisional application No. 62/374,708, filed on Aug. 12, 2016.

(51) Int. Cl.
| | |
|---|---|
| *G06F 17/00* | (2019.01) |
| *G06F 16/23* | (2019.01) |
| *G06F 16/25* | (2019.01) |
| *G06F 16/22* | (2019.01) |
| *G06F 16/2455* | (2019.01) |
| *G06F 16/2453* | (2019.01) |

(52) U.S. Cl.
CPC ........ *G06F 16/235* (2019.01); *G06F 16/2237* (2019.01); *G06F 16/2264* (2019.01); *G06F 16/2282* (2019.01); *G06F 16/2358* (2019.01); *G06F 16/2386* (2019.01); *G06F 16/2455* (2019.01); *G06F 16/2456* (2019.01); *G06F 16/24537* (2019.01); *G06F 16/254* (2019.01)

(58) Field of Classification Search
None
See application file for complete search history.

(56) References Cited

U.S. PATENT DOCUMENTS

| | | | |
|---|---|---|---|
| 2003/0204499 A1* | 10/2003 | Shahabi | G06F 16/283 |
| 2008/0059415 A1* | 3/2008 | Bakalash | G06F 16/24556 |
| 2009/0100086 A1 | 4/2009 | Dumant et al. | |
| 2009/0299969 A1* | 12/2009 | Le | G06F 16/2477 |
| 2011/0055149 A1* | 3/2011 | Pimpale | G06F 16/283 |
| | | | 707/602 |
| 2011/0261049 A1* | 10/2011 | Cardno | G06Q 10/10 |
| | | | 345/419 |

(Continued)

OTHER PUBLICATIONS

Brendon Atkins, Related Pending U.S. Appl. No. 15/382,333, filed Dec. 16, 2016.

(Continued)

*Primary Examiner* — Hung D Le
(74) *Attorney, Agent, or Firm* — Fountainhead Law Group P.C.

(57) ABSTRACT

A method stores records for a set of entities that are generated using an input parameter that is not based on a date. A query is received that includes one or more date parameters, the query for aggregating a value. Upon receiving the query, the method performs: selecting a set of records from the stored records that are valid based on comparing first date information determined from the one or more date parameters and second date information from the records; performing an aggregation calculation of the value for the set of records to generate a query result; and returning the query result in response to the query.

19 Claims, 12 Drawing Sheets

(56) References Cited

U.S. PATENT DOCUMENTS

| | | | |
|---|---|---|---|
| 2011/0295870 A1* | 12/2011 | Bolsius | G06Q 10/10 |
| | | | 707/765 |
| 2014/0122415 A1* | 5/2014 | Chen | G06F 16/283 |
| | | | 707/605 |
| 2015/0006470 A1 | 1/2015 | Mohan | |
| 2015/0356137 A1* | 12/2015 | Andros | G06F 16/2246 |
| | | | 707/715 |
| 2015/0363465 A1* | 12/2015 | Bordawekar | G06F 16/24542 |
| | | | 707/718 |
| 2016/0012111 A1* | 1/2016 | Pattabhiraman | G06F 17/30554 |
| | | | 707/722 |
| 2016/0179922 A1 | 6/2016 | Crupi et al. | |
| 2016/0335303 A1* | 11/2016 | Madhalam | G06F 16/2455 |
| 2016/0335318 A1* | 11/2016 | Gerweck | G06F 16/2264 |
| 2016/0371288 A1 | 12/2016 | Le Biannic et al. | |
| 2017/0116312 A1* | 4/2017 | Reichman | G06F 21/604 |
| 2017/0116313 A1* | 4/2017 | Roytman | G06F 16/245 |
| 2017/0139888 A1* | 5/2017 | Ramlet | G06F 3/0482 |
| 2017/0212938 A1* | 7/2017 | Botros | G06F 16/2477 |
| 2017/0308536 A1* | 10/2017 | Azzam | G06F 16/2425 |
| 2018/0046643 A1* | 2/2018 | Brodt | G06F 17/30174 |

OTHER PUBLICATIONS

Atkins et al, Related Pending U.S. Appl. No. 15/385,597, filed Oct. 27, 2016.

Brendon Atkins, Related Pending U.S. Appl. No. 15/336,535, filed Oct. 27 2016.

Myer et al., Related Pending U.S. Appl. No. 15/336,609, filed Oct. 27, 2016.

* cited by examiner

| | 202-1 | 202-2 | 202-3 | 202-4 | 202-5 | 202-6 |
|---|---|---|---|---|---|---|
| | Entity ID | From Date | To Date | Location | Amount Paid | Headcount |
| 204-1 | 1 | 2015-02-15 | 2015-04-03 | A | 24,000 | 1 |
| 204-2 | 1 | 2015-04-04 | 2015-09-21 | B | 85,500 | 1 |
| 204-3 | 2 | 2015-03-19 | 2015-08-06 | X | 70,500 | 1 |
| 204-4 | 2 | 2015-08-07 | 2015-12-31 | Y | 69,000 | 1 |

FIG. 2

| Entity ID | From Date | To Date | Location | Amount Paid | Headcount | |
|---|---|---|---|---|---|---|
| 1 | 2015-02-15 | 2015-04-03 | A | 24,000 | 1 | ← 502-1 |
| 1 | 2015-04-04 | 2015-09-21 | B | 85,500 | 1 | |
| 2 | 2015-03-19 | 2015-08-06 | X | 70,500 | 1 | ← 502-2 |
| 2 | 2015-08-07 | 2015-12-31 | Y | 69,000 | 1 | |

FIG. 5A

| Entity ID | From Date | To Date | Location | Amount Paid | Headcount | |
|---|---|---|---|---|---|---|
| 1 | 2015-02-15 | 2015-04-03 | A | 24,000 | 1 | |
| 1 | 2015-04-04 | 2015-09-21 | B | 85,500 | 1 | ← 506-1 |
| 2 | 2015-03-19 | 2015-08-06 | X | 70,500 | 1 | ← 506-2 |
| 2 | 2015-08-07 | 2015-12-31 | Y | 69,000 | 1 | |

| Entity ID | From Date | To Date | Location | Amount Paid | Headcount |
|---|---|---|---|---|---|
| 1 | 2015-02-15 | 2015-04-03 | A | 24,000 | 1 |
| 1 | 2015-04-04 | 2015-09-21 | B | 85,500 | 1 |
| 2 | 2015-03-19 | 2015-08-06 | X | 70,500 | 1 |
| 2 | 2015-08-07 | 2015-12-31 | Y | 69,000 | 1 |

FIG. 6B

| Entity ID | From Date | To Date | Location | Amount Paid | Headcount | Selected Period Length | Validity Days |
|---|---|---|---|---|---|---|---|
| 1 | 2015-02-15 | 2015-04-03 | A | 24,000 | 1 | 30 | 3 |
| 1 | 2015-04-04 | 2015-09-21 | B | 85,500 | 1 | 30 | 27 |
| 2 | 2015-03-19 | 2015-08-06 | X | 70,500 | 1 | 30 | 30 |

| Entity ID | From Date | To Date | Location | Amount Paid | Headcount | Selected Period Length | Validity Days | Average Headcount |
|---|---|---|---|---|---|---|---|---|
| 1 | 2015-02-15 | 2015-04-03 | A | 24,000 | 1 | 30 | 3 | 0.10 |
| 1 | 2015-04-04 | 2015-09-21 | B | 85,500 | 1 | 30 | 26 | 0.90 |
| 2 | 2015-03-19 | 2015-08-06 | X | 70,500 | 1 | 30 | 30 | 1 |

| Entity ID | From Date | To Date | Location | Amount Paid | Headcount |
|---|---|---|---|---|---|
| 1 | 2015-02-15 | 2015-04-03 | A | 24,000 | 1 |
| 1 | 2015-04-04 | 2015-09-21 | B | 85,500 | 1 |
| 2 | 2015-03-19 | 2015-08-06 | X | 70,500 | 1 |
| 2 | 2015-08-07 | 2015-12-31 | Y | 69,000 | 1 |

FIG. 7B

| Entity ID | From Date | To Date | Location | Amount Paid | Headcount | Total Days | Validity Days |
|---|---|---|---|---|---|---|---|
| 1 | 2015-02-15 | 2015-04-03 | A | 24,000 | 1 | 48 | 3 |
| 1 | 2015-04-04 | 2015-09-21 | B | 85,500 | 1 | 171 | 27 |
| 2 | 2015-03-19 | 2015-08-06 | X | 70,500 | 1 | 141 | 30 |

| Entity ID | From Date | To Date | Location | Amount Paid | Headcount | Total Days | Validity Days | Pro-Rata Amount Paid |
|---|---|---|---|---|---|---|---|---|
| 1 | 2015-02-15 | 2015-04-03 | A | 24,000 | 1 | 48 | 3 | 1,500 |
| 1 | 2015-04-04 | 2015-09-21 | B | 85,500 | 1 | 171 | 26 | 13,500 |
| 2 | 2015-03-19 | 2015-08-06 | X | 70,500 | 1 | 141 | 30 | 15,000 |

FIG. 7C

CUSTOM QUERY PARAMETERS IN A DATABASE SYSTEM

CROSS REFERENCE TO RELATED APPLICATIONS

The present disclosure claims priority to U.S. Provisional App. No. 62/374,708, entitled "In-Memory Database System for Performing Online Analytics Processing", filed Aug. 12, 2016, the contents of which is incorporated herein by reference in its entirety.

BACKGROUND

In the new era of big data, companies and other organizations have access to vast amounts of structured and unstructured data as well as access to a variety of new data sources. As a result, many data analytics applications have been developed to provide users with insight into their data. One example genre of data analytics applications includes workforce analytics. Workforce analytics applications are used by businesses and other organizations to assist users in understanding their data, making appropriate decisions, and find answers to key questions to gain the insight needed to take actions. Workforce analytics applications are adapted for providing statistical models to worker-related data, allowing companies to optimize their various enterprise processes.

When dealing with analytics across time, the workforce analytics applications use a time dimension. The time dimension may structure records in time periods, such as monthly time periods, in the database. This means that a user is limited to querying the data only based on the way that the time dimension is structured in the database. For example, a user may query only monthly data if the records are structured in monthly time periods. Increasing the granularity of the dimension requires adding a greater number of records to the database, which creates redundant records, affects performance, and uses more storage.

BRIEF DESCRIPTION OF THE DRAWINGS

FIG. 2 depicts an example of records for the entities according to one embodiment.

FIG. 5A shows an example of a table that shows the selected rows according to one embodiment.

FIG. 5B shows an example of the table with the rows selected according to one embodiment.

FIG. 6A shows an example of the table that includes the valid rows according to one embodiment.

FIG. 6B shows an example of the table with the new calculated columns of selected period length and validity days, respectively, according to one embodiment.

FIG. 6C shows an example of the table with an additional calculated column of average headcount according to one embodiment.

FIG. 7A shows an example of the table with the selected rows for the pro-rata measure according to one embodiment.

FIG. 7B shows an example of the table with additional calculated columns for total days and validity days according to one embodiment.

FIG. 7C shows the table with an additional calculated column for the pro rata amount paid according to one embodiment.

DETAILED DESCRIPTION

Described herein are techniques for a query parameter system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments receive a query that includes parameters that are used to dynamically select records in a database. The queries use one or more date parameters, such as a "From date" and a "To date" allows the query to define a custom time. A set of records is selected for an entity that is valid based on comparing the date parameters in the query to date parameters in the records. Then, particular embodiments perform an aggregation calculation for a set of values in a column for the selected records to generate a query result. The aggregation is dynamically performed in a cube data structure upon receiving the query. This allows less records to be stored in the database and also allows more flexibility in querying custom time periods compared to if the data was pre-aggregated in set time slices, such as monthly time periods. The query result is then provided in response to the query.

Figure 1:
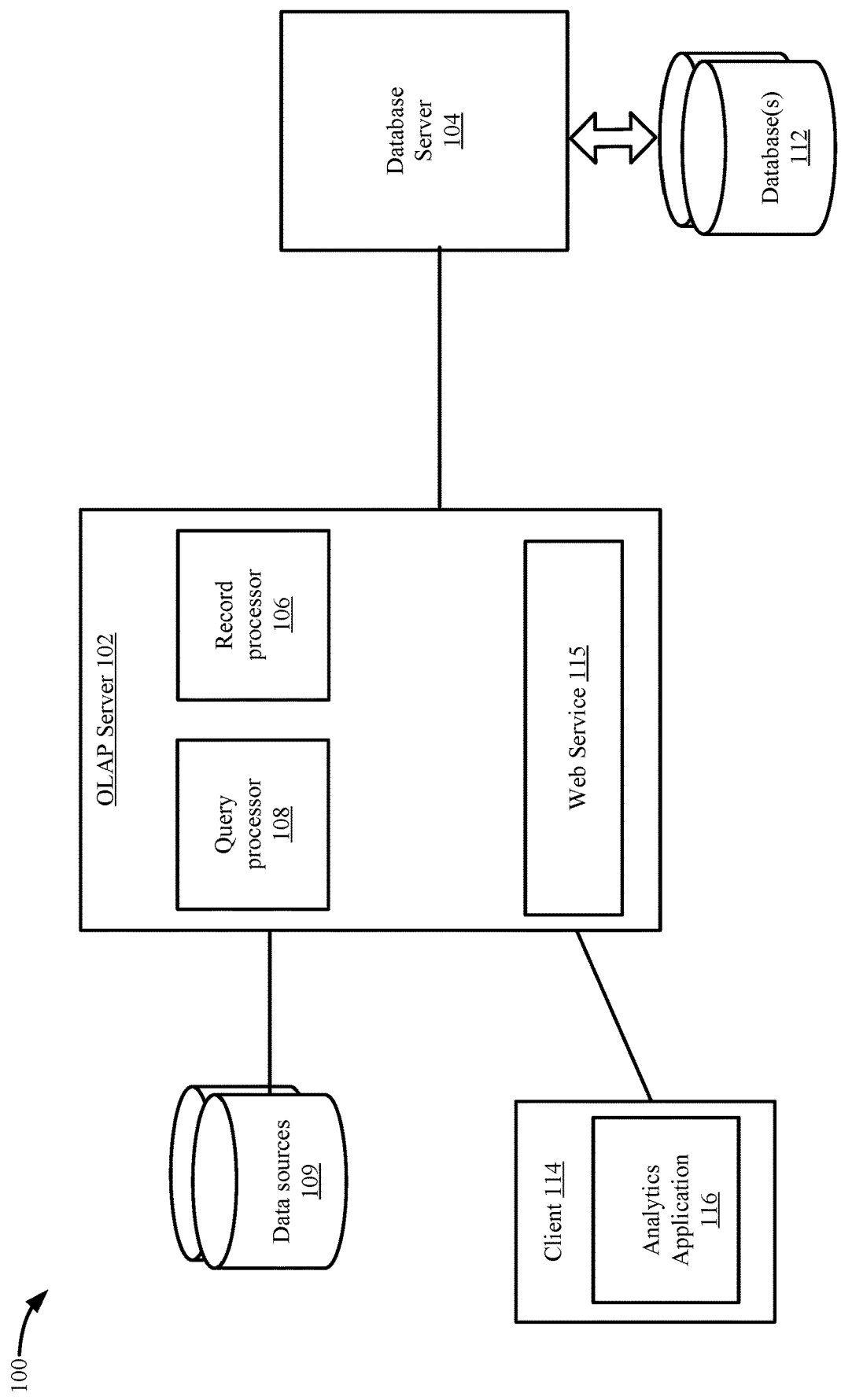
FIG. 1 depicts a simplified system of a system for processing queries using configurable parameters according to one embodiment.

FIG. 1 depicts a simplified system 100 of a system for processing queries using configurable parameters according to one embodiment. Source data is provided by a number of different data sources 109. The source data may be received at an online analytical processing ("OLAP") server 102 or stored in OLAP server 102. Data sources may include data records for one or more entities (e.g., employees, persons, or other entities) of subscribers. Subscribers may include customers, businesses, companies, and other entities for which data is stored in database 112.

In one embodiment, database 112 is an OLAP database that can be accessed by a client 114 using an analytics application 116. Analytics application 116 may include a workforce analytics (WFA) application. As discussed above, workforce analytics applications are used by subscribers in understanding the subscribers' data. For example, workforce analytics applications are adapted for providing statistical models to worker-related data. A web service 115 may be used to respond to queries from analytics application 116 by accessing data in database 112 via database server 104.

Database 112 includes source data for different subscribers that are using analytics application 116. The source data in database 112 may be formatted for the cube data structure. In one example, base measures are built into fact tables and categorized according to dimensions, which may be slices corresponding to time, department, company, division, and location. The data and data object hierarchies can be processed based on collating the dimensions into the cube data array. The cube data structure can aggregate reportable values into aggregates that can be validated and reported to a user. In one example, a cube data structure may enable easy aggregation of multiple values into a single number for analytics reporting via analytics application 116. And each number can be categorized by dimensions to determine the attributes that make up the number.

The cube data structure is queried by analytics application 116 of a client 114. The cube data structure is an interface between OLAP tables in database 112 (e.g., fact, branches, and key mapping tables) and analytics application 116. The cube data structure presents the data in a more readable fashion as measures and dimensions, rather than a collection of tables. The cube data structure also allows queries to be run by analytics application 116. As will be discussed below, the cube data structure may perform some calculations in real-time when a query is received.

A record processor 106 may store records in database 112 for entities. The entities may be employees of a subscriber or other aspects of the subscriber that can be quantified in an entity. In one example, each entity may include one or more records that are stored in database 112 in tables.

Record processor 106 may not pre-slice all the data for entities that can be queried using a time dimension for an entity. For example, record processor 106 may not generate records based on a time dimension that is based on a preset granularity (e.g., monthly). In contrast, record processor 106 generates records in a non-redundant fashion based on an input parameter that is not a time dimension. In one example, the input parameter is a dimension that is not based on time, such as a location or department for the entity. In one embodiment, date parameters include a "From date" and a "To date" that are determined based on the input parameter. The input parameter may be received via input, such as in a definition or received at runtime. In one embodiment, record processor 106 determines the From date and the To date based on the input parameter, such as when the entity worked in a location. For example, the From date and To date may indicate dates when the entity started working in a location and stopped working in a location. Record processor 106 may generate as many records as are needed based on changes in the input parameter. This does not create redundant records that include values that may overlap in time periods for dimensions.

Query processor 108 may receive queries from analytics application 116 and uses the records to respond to the queries. The query may include date parameters that are associated with date information, such as a From date and/or a To date. It is noted that the date parameters in the query do not need to correspond exactly to the From date and To date parameters that are stored in the records in database 112. For example, the query may specify a specific From date and specific To date, such as Apr. 15, 2015 to Apr. 30, 2015 or may specify information that can be used to determine dates, such as the date information may be "the last 16 days". Also, the date information may include both the From date and the To date, or just one of the From date and the To date. For example, some queries may only need to use one of the From date or the To date.

Because the date parameters in the query are configurable, there may not be a record in database 112 that corresponds exactly to the date parameters. For example, there may or may not be a From date in a record for an entity that is on Apr. 15, 2015 and there may or may not be a To date for a record that is Apr. 30, 2015. However, depending on when the entity changed locations, there may be a record for the entity that includes a From date from Feb. 2, 2015 to Aug. 1, 2015 for example. Because of this, calculations need to be performed to aggregate values from the records to respond to the query.

Once receiving the query, query processor 108 provides the date parameters to a cube data structure that can perform the calculations needed to generate the query result. For example, query processor 108 may use the cube data structure to return all rows that are valid for the data parameters. Then, the cube data structure performs calculations using values from an appropriate column in the retrieved records. For example, the calculations may aggregate values from the column for multiple records. If needed, the cube data structure may calculate new values that can be aggregated. For example, the cube data structure can calculate new columns for the records and then aggregate values in the new columns. Having the cube data structure perform the calculations is different from performing the aggregations prior to receiving the query and using the cube data structure to retrieve the pre-calculated aggregations. Query processor 108 then returns a query result to client 114 based on the calculations by the cube data structure.

The use of the cube data structure to perform the calculations for the aggregation when the query is received provides a more flexible approach to responding to queries compared to pre-calculating values based on predetermined granularities of time. In particular embodiments, a user is not limited to a specific granularity of time in the query. Rather, the user can specify any From date and/or To date in the query. By performing the calculation using the cube data structure when the query is received, particular embodiments do not need to store all the records for predetermined granularities of the time dimension. Rather, the aggregation is performed in response to the From date and/or To date that are determined from the query. This results in a significant reduction in redundant data within database 112 because the results of the aggregations do not need to be stored. The above record processing and query processing will now be described in more detail.

Record Processing

The following will describe a scenario that could be used to generate records in database 112 that are used to respond to queries.

For an entity #1, the following information is provided to record processor 106:

Hired 2015 Feb. 15 into location A

Transfers into location B on 2015 Apr. 4

Terminated on 2015 Sep. 21

Was paid a total of $24,000 for the period 2015 Feb. 15 to 2015 Apr. 3

Was paid a total of $85,500 for the period 2015 Apr. 4 to 2015 Sep. 21

For an entity #2, the following information is provided to record processor 106:

Hired 2015 Mar. 19 into location X

Transfers into location Y on 2015 Aug. 7

Was paid a total of $70,500 for the period 2015 Mar. 19 to 2015 Aug. 6

Was paid a total of $69,000 for the period 2015 Aug. 7 to 2015 Dec. 31

Record processor 106 then processes the data to generate records for a table in database 112. FIG. 2 depicts an example of records for the entities according to one embodiment. Table 200 includes columns 202-1-202-6 for an entity ID, From date, To date, location, amount paid, and headcount. The entity ID is the identifier for the entity, such as a person or employee identifier. The From date and To date are dates that are determined based upon the input parameter. In this example, the input parameter is the location for the entity. The amount paid is the amount paid to the entity during the date range between the From date and To date. The headcount is the headcount during the From date and To date period.

In table 200, rows 204-1 and 204-2 are for entity #1 and rows 204-3 and 204-4 are for entity #2. For entity #1, row 204-1 is for the first time period when entity #1 was in location A and row 204-2 is for the time period when entity #1 was in location B. For row 204-1, entity #1 was hired on Feb. 15, 2015 and stayed in location A until Apr. 3, 2015. Then, entity #1 transferred into location B on Apr. 4, 2015. The change in the input parameter causes a new record to be generated in row 204-2. The To date in row 204-1 and From date in row 204-2 reflect the transfer to the new location. Also, entity #1 was terminated on Sep. 21, 2015 and that is shown in the To date in row 204-2. Columns 202-5 and 202-6 show the applicable amount paid and headcount for the time periods defined by each record for entity #1.

Entity #2 was hired on Mar. 19, 2015 into location X and stayed in location X until Aug. 6, 2015, which is shown in row 204-3. Row 204-4 represents that entity #2 transferred into location Y on Aug. 7, 2015 and left the department as of the date Dec. 31, 2015. Columns 202-5 and 202-6 show the applicable amount paid and headcount for the time periods defined by each record for entity #2.

It is noted that there was no requirement to pre-slice the data in defined time periods based on a time dimension. In table 200, the records were generated based on a change in the location dimension. Record processor 106 did not generate records for a time granularity and then calculate the measures for that time granularity.

Figure 3:
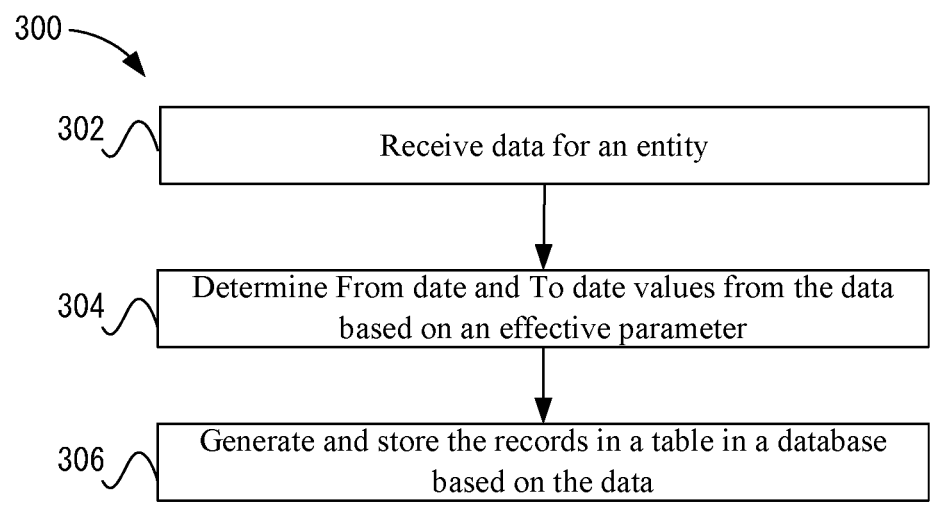
FIG. 3 depicts a simplified flowchart of a method for generating records according to one embodiment.

FIG. 3 depicts a simplified flowchart 300 of a method for generating records according to one embodiment. This process may be performed for each entity for which data is received. At 302, record processor 106 receives data for an entity. The data may be transactions similar to that described above for entity #1 and entity #2. At 304, record processor 106 determines From date and To date values from the data based on an input parameter. The input parameter may be a dimension that is not date-based. At 306, record processor 106 then generates and stores the records in table 200 in database 112 based on the data. The records are stored with values for dimensions that are associated with columns of table 200. This may involve calculating some values for the dimensions in the table.

Query Processing

Figure 4:
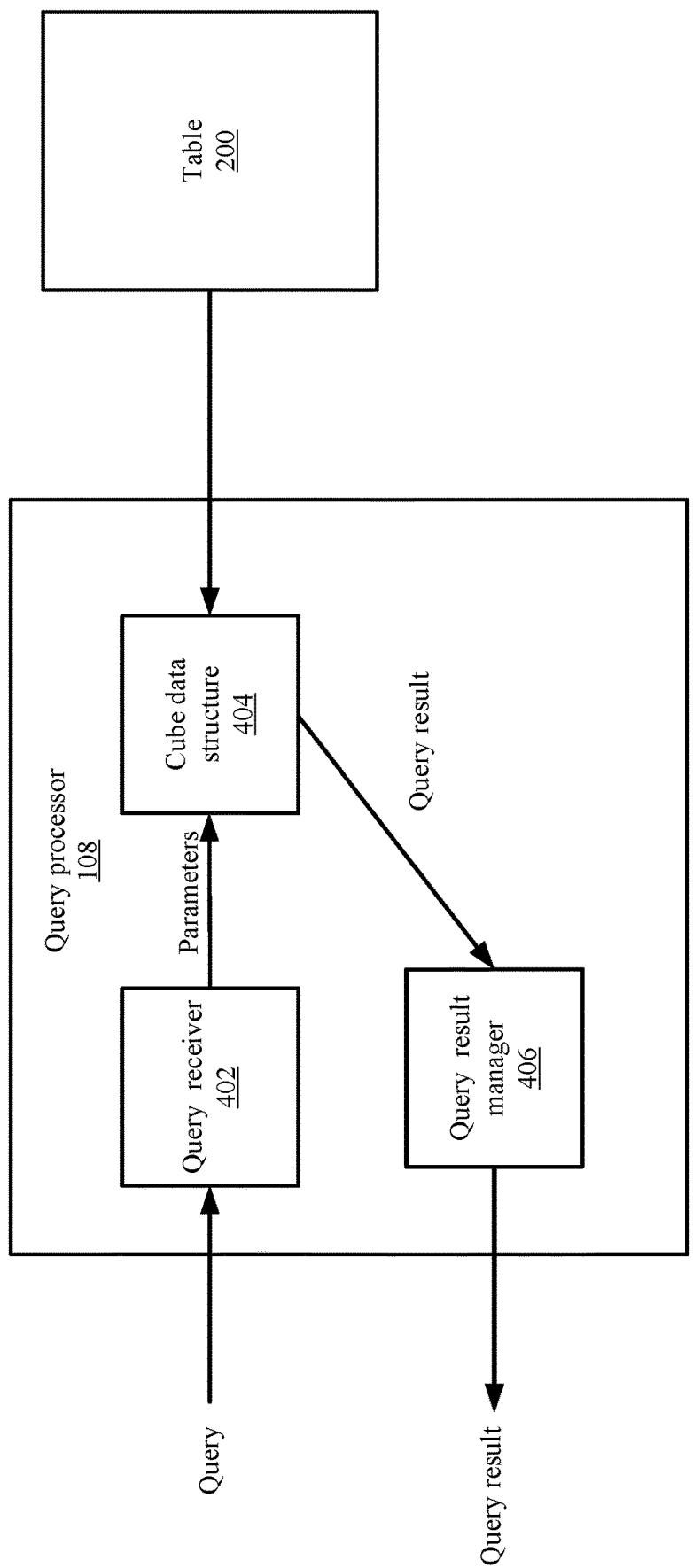
FIG. 4 depicts a more detailed example of a query processor according to one embodiment.

FIG. 4 depicts a more detailed example of query processor 108 according to one embodiment. A query receiver 402 receives a query from analytics application 116. The query specifies what aggregation should be performed and also one or more date parameters. For example, the query may request different measures be calculated, such as start of period measures, end of period measures, and average measures. Other measures may also be requested in the query. Additionally, the query may specify one or more date parameters, such as a From date and To date. If a single month, such as April, is requested, then the From date may be Apr. 1, 2015 and the To date may be Apr. 30, 2015. The date parameters may also be received in different formats, such as a query may specify the month of April or the last 30 days instead of using a From date and a To date.

Query receiver 402 may pass the date parameters to cube data structure 404 along with the measures the query wants to calculate. Cube data structure 404 can then perform the calculations dynamically after the query is received. Cube data structure 404 may include logic that is used to determine which calculations to perform. The logic may be predetermined as part of the measure definition. The measure definition includes information about how to calculate the measure, such as how the measure is rolled up across time i.e. end of period, start of period, average, or pro rata. Cube data structure 404 performs the calculations using table 200 from database 112. For example, cube data structure 404 selects all rows that are valid using the date parameters. Although a single table 200 is described, cube data structure 404 may select records from multiple tables. Then, cube data structure 404 aggregates the appropriate column based on the query. For example, the values in the appropriate column are based on a measure that has been requested from the query. A query result manager 406 then returns the query result to analytics application 116.

Different examples of the calculations will now be described. In one embodiment, the query may request a start of period measure. For example, a query may request a start of period headcount measure for a single month of April (e.g. From date of Apr. 1, 2015 and/or a To date of Apr. 30, 2015). Cube data structure 404 may first select all rows that are valid as of the From date parameter only. The From date parameter is only used because this is a start of period query and cube data structure 404 needs to determine headcount at the start of the period, which is Apr. 1, 2015, and not at the end of the period. Thus, for a query that requests a start of period measure, only the From date may be received although a From date and To date may also be received.

FIG. 5A shows an example of table 200 that shows the selected rows according to one embodiment. Cube data structure 404 has selected rows 204-1 and 204-3 because the rows are valid as of the From date parameter in the query. That is, for row 204-1, the record is valid from Feb. 15, 2015 to Apr. 3, 2015, which means that this record is valid on Apr. 1, 2015. For row 204-3, the record was valid from Mar. 19, 2015 to Aug. 6, 2015, which means this record is valid Apr. 1, 2015. The other rows in table 200 were not valid as of Apr. 1, 2015. For example, row 204-2 includes a record that is valid from Apr. 4, 2015, which is after Apr. 1, 2015. Similarly, row 204-4 includes a record that is valid from Aug. 7, 2015, which is after Apr. 1, 2015.

Cube data structure 404 then aggregates the appropriate column based on the query, which is headcount in this case. For example, cube data structure 404 aggregates the headcount as 1+1=2 from the headcount found at 502-1 and 502-2. That is, the headcount is 2 for the start of the period of Apr. 1, 2015.

For an end of period measure query, cube data structure 404 selects all rows that are valid as of the To date parameter only. In this case, only the To date parameter could be received in the query, but a date range including a From date and To date could be received. FIG. 5B shows an example of table 200 with the rows selected according to one embodiment. For example, in order to calculate the end of period headcount in April of 2015, cube data structure 404 selects rows 204-2 and 204-3 as being valid based on the To date parameter of Apr. 30, 2015. For example, row 204-2 includes a record that is valid from Apr. 4, 2015 to Sep. 21, 2015, which includes Apr. 30, 2015. Similarly, row 204-3 includes a record that is valid from Mar. 19, 2015 to Aug. 6, 2015, which also includes Apr. 30, 2015. Rows 204-1 and 204-4 do not include records that are valid on Apr. 30, 2015. For example, the record in row 204-1 has a To date before Apr. 30, 2015, and the record in row 204-4 includes a From date that is after Apr. 30, 2015.

Cube data structure 404 then aggregates the appropriate column for the query, which in this case is headcount. For example, at 506-1 and 506-2, the values of 1+1=2 from rows 204-2 and 204-3 are aggregated for the headcount. This indicates the headcount at the end of the period is "2".

For a query that requested an average measure, cube data structure 404 selects all rows that are valid from any point between the two date parameters. In this case, a time period with a To date and a From date is determined from the query. FIG. 6A shows an example of table 200 that includes the valid rows according to one embodiment. For example, in order to calculate the average headcount from Apr. 1, 2015 to Apr. 30, 2015, cube data structure 404 selects rows 204-1, 204-2, and 204-3 as the valid rows with headcounts shown at 601-1, 601-2, and 601-3. Cube data structure 404 selects the records in rows 204-1, 204-2, and 204-3 because the records are valid from any point between Apr. 1, 2015 and Apr. 30, 2015. The record in row 204-4 is not valid at any time between Apr. 1, 2015 and Apr. 30, 2015 as the From date starts from Aug. 7, 2015.

Because this is an average measure, cube data structure 404 may need to perform other calculations before performing the aggregation. For example, not all of the records may be valid for the full period. In one example, record #1 in row 204-1 is valid only from Apr. 1, 2015 to Apr. 3, 2015. Similarly, the record in row 204-2 is valid only from Apr. 4, 2015 to Apr. 30, 2015. The record in row 204-3 is valid for the entire period. Cube data structure 404 will then perform calculations and generate new calculated columns according to one embodiment. FIG. 6B shows an example of table 200 with the new calculated columns 602-1 and 602-2 of selected period length and validity days, respectively, according to one embodiment. The selected period length is the length between the two date parameters, which is 30 days for April. The validity days is the number of days for which the respective record is valid. For example, the record in row 204-1 was valid for 3 days; the record in row 204-2 was valid for 27 days; and the record for row 204-3 was valid for the full period of 30 days.

Using the new calculated columns, cube data structure 404 can calculate a percentage to calculate an average measure. FIG. 6C shows an example of table 200 with an additional calculated column 602-3 of average headcount according to one embodiment. The average headcount is the average measure that is requested from the query. For example, in row 204-1, the average headcount is 0.10, which is calculated based on the number of validity days divided by the selected period length–3/30=0.10. The average headcount for the other rows is calculated similarly for row 204-2 as 27/30=0.90 and for row 204-3 of 30/30=1. This is the average headcount that each record contributes for each entity. Cube data structure 404 calculates the query result as 0.10+0.90+1=2 as the average headcount for the period. The average headcount is 2 because both employees were fully employed during the period. Even though entity #1 changed departments during the period, entity #1 remained employed by the company during the whole period. If entity #1 had left the company midway through April, then the average headcount would be less than 2.

Cube data structure 404 may also calculate pro rata measures. Cube data structure 404 selects all rows that are valid at any point between the To date and the From date. FIG. 7A shows an example of table 200 with the selected rows for the pro-rata measure according to one embodiment. The pro-rata measure is the portion of amount paid in the valid period. The total number of days in the time frame and the number of valid days are needed to calculate the pro-rata measure. To determine this, the rows that are valid at any point between the To date and the From date are selected. For example, at 702, cube data structure 404 has selected rows 204-1, 204-2, and 204-3. These rows are selected for the same reasons as described above in FIG. 6A because these rows are valid at some point during the month of April.

For each row, cube data structure 404 calculates how long each record is valid for in total and how long the record is valid for within the given date parameters. FIG. 7B shows an example of table 200 with additional calculated columns for total days and validity days according to one embodiment. For example, a column 704-1 shows the total days and a column 704-2 shows the validity days. For row 204-1, the record was valid from Feb. 15, 2015 to Apr. 3, 2015, which is 48 days. For the month of April, the record is valid from Apr. 1, 2015 to Apr. 3, 2015, which is 3 days. The values for total days and validity days for the records in rows 204-2 and 204-3 can be calculated similarly.

Cube data structure 404 uses the new calculated columns to calculate pro rata values. For example, the amount paid within the given date parameters can be calculated. FIG. 7C shows table 200 with an additional calculated column for the pro rata amount paid according to one embodiment. The pro rata amount paid may be the pro rata amount paid in salary to the entity for each record. For the record in row 204-1, the pro rata amount paid was $1,500. In this case, the record was valid for 3 days out of 48 days and the total amount paid during the 48 days was $24,000. A pro rata amount may be calculated as (3/48)*$24,000=$1,500. Cube data structure 404 calculates the pro rata amount paid for rows 204-2 and 204-3 similarly.

Cube data structure 404 may then aggregate the pro rata amount paid values for the query. For example, the pro rata amount paid during the month of April is $1,500+$13,500+$15,000=$30,000. Cube data structure 404 may then return $30,000 as the query result.

Figure 8:
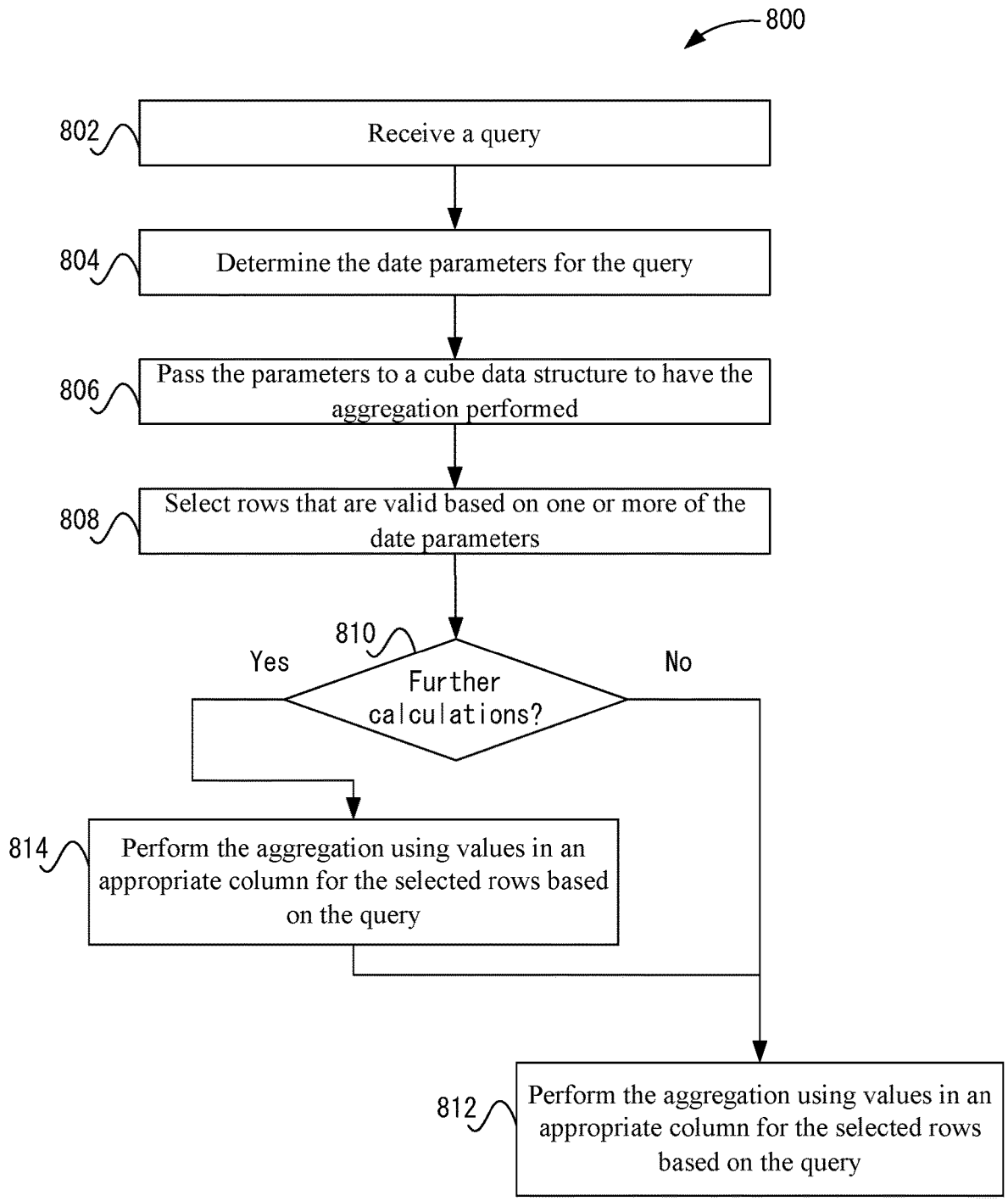
FIG. 8 depicts a simplified flowchart of a method for processing the query according to one embodiment.

FIG. 8 depicts a simplified flowchart 800 of a method for processing the query according to one embodiment. At 802, query processor 108 receives a query. At 804, query processor 108 determines the date parameters for the query. For example, date parameters of a From date and a To date may be received. Also, only one of the From date and the To date may be received depending on the query or any date parameter to indicate a time period may be received. Additionally, the query may specify an aggregation to be performed.

At 806, query processor 108 passes the parameters to cube data structure 404 to have the aggregation performed. At 808, cube data structure 404 selects rows that are valid based on one or more of the date parameters. At 810, cube data structure 404 then determines if further calculations need to be performed. At 812, if not, then cube data structure 404 performs the aggregation using values in an appropriate column for the selected rows based on the query. At 814, if additional calculations need to be performed, cube data structure 404 performs the calculations based on the selected rows and generates new calculated columns. Then, the process proceeds to 812 to perform the aggregation with the new calculated columns as described in 810.

Accordingly, by using a query that provides date parameters that can be customized, particular embodiments can produce query results that significantly save the amount of storage used in a database due to lack of redundancy in the number of records that need to be stored. Particular embodiments also allow flexibility with time periods that can be specified in queries. Previously, users may have been limited to only time periods that had been pre-calculated. With particular embodiments, users are no longer restricted to a single time period breakdown that has been pre-determined. The user can create custom time period dimensions that do not need to conform to any pre-calculated time period. The time period specified in the query can be as granular as a single day or cover multiple years at a time. This not only provides more efficient use of storage in the database, but also provides a benefit to the user allowing more granular queries by performing real-time calculations when the query is received.

System

Figure 9:
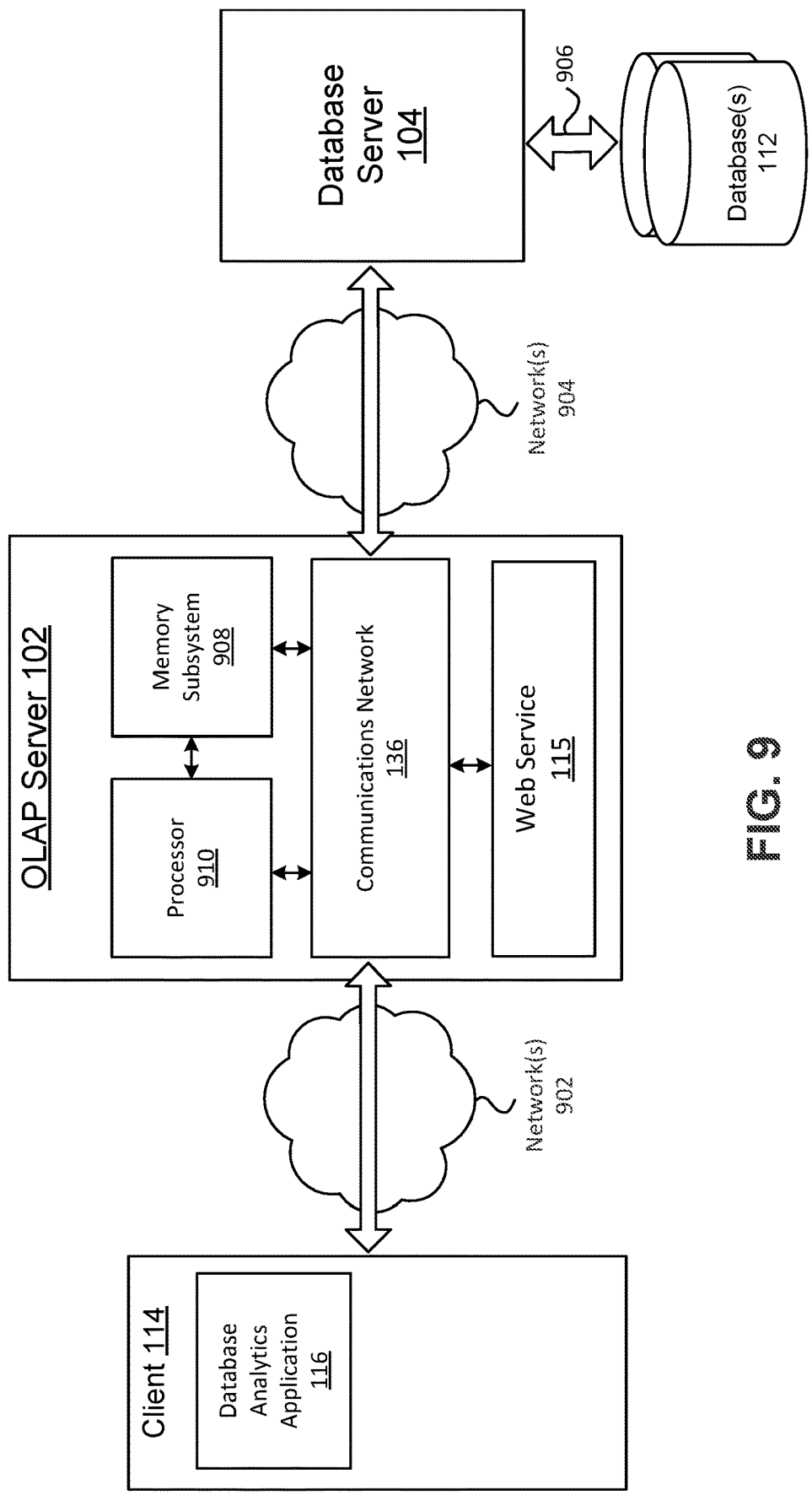
FIG. 9 depicts a conceptual overview block diagram of an example embodiment of a system for processing queries in accordance with the techniques described in this disclosure.

FIG. 9 depicts a conceptual overview block diagram of an example embodiment of a system for processing queries in accordance with the techniques described in this disclosure. The described database analytics application may be web-based or may reside locally on a user's computer system. The database analytics application may be used to interact with and to configure and view reports of subscriber data. In one embodiment, the system may be configured to provide a user interface for the analytics application via a web service in, for example, in a cloud-based computer network architecture.

As shown in FIG. 9, one or more clients 114, each having at least one user interface, are in communication with OLAP server 102, which may be a web server, via one or more networks 902 and communications network 136. OLAP server 102 may provide a web service, such as an OLAP service, to the user interfaces of the clients 114 via, for example, a web service application 115 stored on OLAP server 102. OLAP server 102 includes processor 910 and memory subsystem 908 to perform the scenario selection process described herein.

In FIG. 9, OLAP server 102 is further in communication with a backend database server 104 over one or more networks 904 via communications network 136. The database server 104 is further in communication with one or more databases 112 adapted to store data. In one embodiment, the database server 104 may be in remote communication with the databases 112 via one or more communication links or networks 906. Alternatively, database 112 may be a component of the database server 104 and configured to communicate with the database server 104 via a direct or indirect connection or network. In addition, the database(s) 112 may be implemented as any type of database system. One example embodiment includes a relational database system in which data is stored in structured database tables (or other data structures) comprised of rows and columns, and accessed through data storage rules (or schemas). Other examples of database systems include database systems where data can be stored in a semi-structured or unstructured format.

In one embodiment, the database server 104 can be configured to perform data accesses operations on data stored in the databases 112 via one or more communications links 906. The database server 104 may be implemented as an individual computer hardware server or as an array of computer hardware servers logically coupled together and working in a functionally coordinated manner. Generally, a database server 104 comprises a system configured to perform data access operations with respect to data stored in one or more repositories of data (e.g., database(s)). Depending on the type of database server 104, data operations may range from simple operations, such as storing and retrieving data, to more complex operations such as calculating statistics based on the data, or arranging, modifying, or formatting data.

The database server 104 may be configured to communicate with a memory subsystem to store and retrieve data for performing operations in accordance with the techniques described in this disclosure. The database server 104 may further include a database manager (not shown). The database manager may be configured as a general-purpose database management system ("DBMS") that communicates with the one or more databases for the purposes of storing and retrieving data to or from the databases. A DBMS may be configured as a computer software application that interacts with the database and other applications or users to capture and analyze data.

For example, a DBMS may be designed to allow for definition, creation, querying, update, and administration of databases. The database manager may comprise an integrated set of computer hardware and software programs that allow client systems to interact with the databases to provide access to data. In addition, the database manager may provide various functions that allow entry, storage, and retrieval of large quantities of information, and provide a mechanism to manage how the information is organized in the databases.

A database "query" may comprise a request for data or information from a database table or combination of database tables (or other data structures) in the database. Queries are the mechanism for retrieving information from a database and generally consist of questions presented to the database in a predefined format. This data may be generated as results returned by the SQL, or as pictorials, graphs or complex results, e.g., trend analysis from data-mining applications. Many database management systems use the SQL standard query format.

At least certain embodiments are configured to be implemented using in-memory analytics. In-memory analytics is an approach to querying data when it resides in a computer's random access memory (RAM) as opposed to querying data that is stored on separate physical disks. This can result in vastly shortened query times, allowing business intelligence and analytics applications to support faster business decisions. In addition to providing fast query response times, in-memory analytics can reduce or eliminate the need for data indexing and storing pre-aggregated data. This can reduce IT costs and allow faster implementation of business intelligence and analytics applications. In one embodiment, the system described in this disclosure can be implemented on an in-memory, column-oriented, relational database management system. The platform allows data analysts to query large volumes of data in real time, and its in-memory database infrastructure can free analysts from having to continuously load or write-back data to physical disks.

As will be appreciated by persons of skill in the art, network(s) may be implemented as a single wired or wireless network, or multiple separate networks in communication with one another. Network(s) may be implemented as any wired or wireless network(s). For example, the networks described herein can be implemented as a local area network ("LAN"), wide-area network ("WAN"), combination of LANs and WANs, the Internet, or any other type of communication network adapted for communicating electronic messages and information. Further, network(s) may be implemented as a physical array of hardware resources or as a virtual array, or any combination thereof. Network(s) may also be implemented in a cloud-based network configuration. For example, network(s) may be implemented as public or private cloud network, or combination thereof. No specific network or network architecture should be construed as limiting the embodiments and techniques described herein.

Figure 10:
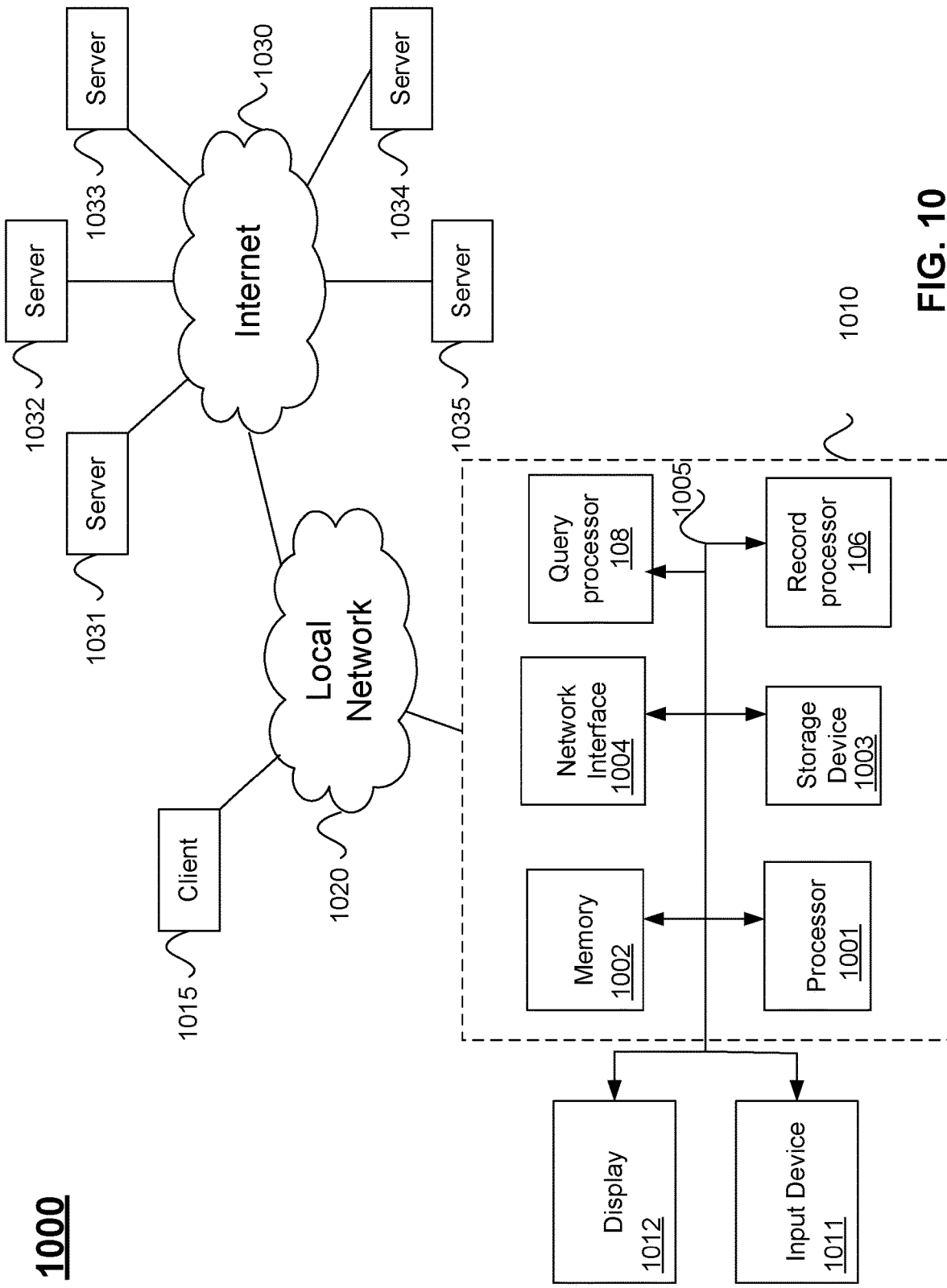
FIG. 10 illustrates hardware of a special purpose computing machine configured with a record processor and a query processor according to one embodiment.

FIG. 10 illustrates hardware of a special purpose computing machine configured with record processor 106 and query processor 108 according to one embodiment. An example computer system 1010 is illustrated in FIG. 10. Computer system 1010 includes a bus 1005 or other communication mechanism for communicating information, and a processor 1001 coupled with bus 1005 for processing information. Computer system 1010 also includes a memory 1002 coupled to bus 1005 for storing information and instructions to be executed by processor 1001, including information and instructions for performing the techniques described above, for example. This memory may also be used for storing variables or other intermediate information during execution of instructions to be executed by processor 1001. Possible implementations of this memory may be, but are not limited to, random access memory (RAM), read only memory (ROM), or both. A storage device 1003 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1003 may include source code, binary code, or software files for performing the techniques above, for example. Storage device and memory are both examples of computer readable storage mediums.

Computer system 1010 may be coupled via bus 1005 to a display 1012, such as a cathode ray tube (CRT) or liquid crystal display (LCD), for displaying information to a computer user. An input device 1011 such as a keyboard and/or mouse is coupled to bus 1005 for communicating information and command selections from the user to processor 1001. The combination of these components allows the user to communicate with the system. In some systems, bus 1005 may be divided into multiple specialized buses.

Computer system 1010 also includes a network interface 1004 coupled with bus 1005. Network interface 1004 may provide two-way data communication between computer system 1010 and the local network 1020. The network interface 1004 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1004 sends and receives electrical, electromagnetic, or optical signals that carry digital data streams representing various types of information.

Computer system 1010 can send and receive information through the network interface 1004 across a local network 1020, an Intranet, or the Internet 1030. In the Internet example, software components or services may reside on multiple different computer systems 1010 or servers 1031-1035 across the network. The processes described above may be implemented on one or more servers, for example. A server 1031 may transmit actions or messages from one component, through Internet 1030, local network 1020, and network interface 1004 to a component on computer system 1010. The software components and processes described above may be implemented on any computer system and send and/or receive information across a network, for example.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
    storing, by a computing device, records for a set of entities that are generated using an input parameter that is not based on a time dimension of a preset granularity, wherein each record includes a first from date and a first to date, the first from date being a first date from which a record is valid for the input parameter and the first to date being a second date to which a record is valid for the input parameter;
    receiving, by the computing device, a query that includes one or more date parameters, the query for aggregating a value;
    upon receiving the query, performing:
        selecting, by the computing device, a set of records from the stored records that are valid based on comparing one or more of a second from date and a second to date that is determined from the one or more date parameters of the query and one or more of the first from date and the first to date for each of the records, the second from date being a third date to start the aggregation and the second to date being a third date to end the aggregation;
        performing, by the computing device, an aggregation calculation to aggregate information in the set of records for the value to generate a query result; and
        returning, by the computing device, the query result in response to the query.

2. The method of claim 1, wherein storing the records comprises:
    analyzing values for the input parameter for each entity in the set of entities; and
    generating the records based on a change in value of the input parameter for each entity.

3. The method of claim 2, wherein a new record is generated for an entity when the value for the input parameter changes.

4. The method of claim 1, wherein the input parameter is a dimension that does not include date values.

5. The method of claim 1, wherein the one or more date parameters are used to determine one or more of a from date and a to date, the from date being a first date to start the aggregation and the to date being a second date to end the aggregation.

6. The method of claim 1, wherein the query is for aggregating a measure.

7. The method of claim 1, wherein selecting the set of records from the stored records that are valid comprises:
   determining which records are valid based on one or more of the particular from date and the particular to date associated with the records, the from date being a first date from which a record is valid for the input parameter and the to date being a second date to which a record is valid for the input parameter.

8. The method of claim 1, further comprising:
   calculating a new set of values for the records that are valid based on the one or more date parameters.

9. The method of claim 8, wherein performing the aggregation calculation comprises:
   aggregating the new set of values for the records to generate the query result.

10. The method of claim 1, further comprising:
    passing the query to a cube data structure that performs the selecting of the valid records and the performing of the aggregation calculation.

11. A non-transitory computer-readable storage medium containing instructions, that when executed, control a computer system to be configured for:
    storing records for a set of entities that are generated using an input parameter that is not based on a time dimension of a preset granularity, wherein each record includes a first from date and a first to date, the first from date being a first date from which a record is valid for the input parameter and the first to date being a second date to which a record is valid for the input parameter;
    receiving a query that includes one or more date parameters, the query for aggregating a value;
    upon receiving the query, performing:
       selecting a set of records from the stored records that are valid based on comparing one or more of a second from date and a second to date that is determined from the one or more date parameters of the query and one or more of the first from date and the first to date for each of the records, the second from date being a third date to start the aggregation and the second to date being a third date to end the aggregation;
       performing an aggregation calculation to aggregate information in the set of records for the value to generate a query result; and
       returning the query result in response to the query.

12. The non-transitory computer-readable storage medium of claim 11, wherein storing the records comprises:
    analyzing values for the input parameter for each entity in the set of entities; and
    generating the records based on a change in value of the input parameter for each entity.

13. The non-transitory computer-readable storage medium of claim 11, wherein selecting the set of records from the stored records that are valid comprises:
    determining which records are valid based on one or more of the particular from date and the particular to date associated with the records, the from date being a first date from which a record is valid for the input parameter and the to date being a second date to which a record is valid for the input parameter.

14. The non-transitory computer-readable storage medium of claim 11, further comprising:
    calculating a new set of values for the records that are valid based on the one or more date parameters; and
    aggregating the new set of values for the records to generate the query result.

15. A method comprising:
    storing, by a computing device, records for a set of entities that are based on an input parameter that is not based on a time dimension of a preset granularity, wherein each record includes a first from date and a first to date, the first from date being a first date from which a record is valid for the input parameter and the first to date being a second date to which a record is valid for the input parameter;
    receiving, by the computing device, a query that includes one or more date parameters, the query for aggregating a value;
    upon receiving the query, performing:
       selecting, by the computing device, a set of records from the stored records that are valid based on comparing one or more of a second from date and a second to date that is determined from the one or more date parameters and one or more of the first from date and first to date from the records, the second from date being a third date to start the aggregation and the second to date being a third date to end the aggregation;
       performing, by the computing device, an aggregation calculation to aggregate information in the set of records for the value to generate a query result; and
       returning, by the computing device, the query result in response to the query.

16. The method of claim 15, wherein the one or more date parameters are used to determine one or more of the second from date and the second to date.

17. The method of claim 15, wherein the query includes the one or more of the second from date and the second to date.

18. The method of claim 15, wherein storing the records comprises:
    analyzing values for the input parameter for each entity in the set of entities; and
    generating the records based on a change in value of the input parameter for each entity, wherein each record includes the first from date and the first to date that are determined based on the change.

19. The method of claim 15, wherein selecting the set of records from the stored records that are valid comprising:
    determining which records are valid based on one or more of second from date and the second to date being valid based on the one or more of the first from date and the first to date.

* * * * *